Aug. 27, 1957

H. A. MANTZ 2,804,525

COMBINATION CONTROL DEVICE

Filed Jan. 27, 1955

INVENTOR.
HAROLD A. MANTZ
BY
Maurice A. Weikart
ATTORNEY

Aug. 27, 1957     H. A. MANTZ     2,804,525
COMBINATION CONTROL DEVICE
Filed Jan. 27, 1955     2 Sheets-Sheet 2

*INVENTOR.*
HAROLD A. MANTZ
BY
*Maurice A. Weikart*
ATTORNEY

United States Patent Office 2,804,525
Patented Aug. 27, 1957

2,804,525

COMBINATION CONTROL DEVICE

Harold A. Mantz, Milwaukee, Wis., assignor, by mesne assignments, to General Controls Co., a corporation of California Application January 27, 1955, Serial No. 484,413

17 Claims. (Cl. 200—140)

This invention relates generally to combination control device in which two or more control members are actuated, either simultaneously or in sequence, by a single condition responsive actuator. More specifically, the invention comprises an improved temperature responsive switch mechanism in which a single temperature responsive actuator operates, in sequence, two independent switches as the actuator responds to a change in temperature.

In recent years more and more domestic heating systems of the forced circulation type have been installed as compared to the gravity circulation type. These forced circulation systems require the use of a motor-driven circulating fan in the case of warm air heating systems, and of motor-driven circulating pumps, or circulators, in hot water heating systems. Since the fan, or the circulator, should operate only when the heating medium is above a certain minimum temperature (to prevent chilling the rooms to be heated and their occupants), it has been customary to control the operation of the fan or circulator by means of a switch which responds to the temperature of the heating medium by means of a temperature sensing element extending into the circulatory path of the heating medium.

Safety precautions, and the necessity to prevent damage to the furnace or boiler by overheating, have made conventional the use of a temperature responsive switch similar to the fan or circulator control switch. This high temperature limit control serves to shut down the heat generating portion of the furnace or boiler should its temperature rise above a safe level. Conventionally, the temperature sensing element of this control, also, extends into the circulatory path of the heating medium.

For both the limit control and the fan or circulator control rapidity of response can be quite important, and the location of the thermal sensing element in the heating medium circulatory path can be very critical. Since both controls are related in function, the proposal has been made, in the past, to combine the two controls for operation by a single temperature sensing and actuating element. Since the limit control must function to open its contacts on a rise in heating medium temperature beyond a safe value, and since the fan or circulator control must open its contacts on a decrease in temperature to a predetermined low value (with this predetermined safe value being, typically, one hundred degrees above the predetermined low value), the performance of these switching operations by a single actuator has necessitated the use of linkages between the actuator and the switches which have been something other than the dependable and rugged arrangement which modern domestic heating plants require.

The principal object of the present invention is to provide a combination fan or circulator and high limit control having a simple, rugged, and easily manufactured linkage between the temperature responsive actuator and the component switches.

A further object is to provide a combination control in which the linkage between the temperature responsive actuator and the component switches incorporates a fail-safe function through which, upon failure of the temperature sensing system, the limit control switch component will be moved to open position to shut off the heating plant.

A further object is to provide a combination control which is particularly adaptable to a liquid expansion type of temperature sensing and actuating element.

A further object is to provide a combination control which incorporates enclosed switches which can be interchanged with similar switches having differing ratings or pole characteristics.

The accompanying drawings illustrate an embodiment of the invention.

Figure 1:
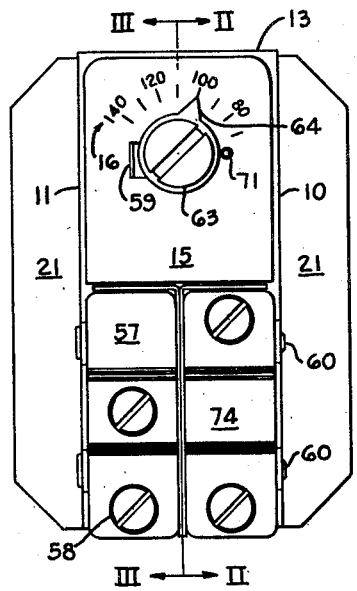
Figure 1 is a top view of the control.

Referring principally to Figures 1, 2, 3 and 4, there is a housing for the control device having side walls 10 and 11, a front face 12, extending midway down the length of the side walls, and a downturned flange forming an end wall portion 13. A plate 15 overlies the front face 12. Plate 15 carries temperature scale markings 16, shown in Figure 1, and is rigidly secured by any suitable means to the face plate 12. Closing the base portion of the housing, and attached to it by any suitable means, is a base member 17, having upturned end flanges 19 and 20. Member 17 also has sidewardly extending flanges 21 which may be utilized for mounting the control device.

Secured to the outer face of member 17, by means of screws 22 (Figure 2) is an actuator member 23. Member 23 is shown in cross-section in Figure 3 and is of the conventional type in which an outer shell 24 encloses a flexible inner wall 26. A capillary tube 27 is connected to the chamber thus formed, the tube 27 extending to a temperature sensing bulb (not shown) which is located at the area of critical temperature. The bulb, capillary tube and actuator chamber are customarily filled with an expansible fluid which, upon a temperature change at the area of the bulb, changes in volume and moves the flexible wall 26 in response to such volumetric change.

Figure 7:
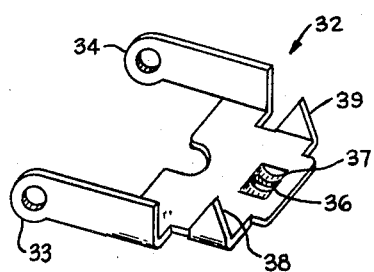
Figure 7 is a perspective view of one of the levers forming a part of the mechanism shown in the foregoing figures.

The movement of wall 26 on temperature change is transmitted to the lever system of the control by means of a thrust stud 29 (Figure 3) having an extending member 30 of reduced diameter and forming thereby a shoulder 31 intermediate the ends of the stud 29. A force transmitting lever 32 (shown in detail at Figure 7), pivotally connected to side walls 10 and 11 by means of legs 33 and 34, has an opening 36 and an indented bearing portion 37. Portion 37 bears against the shoulder 31 and member 30 extends freely through the opening 36.

Figure 5:
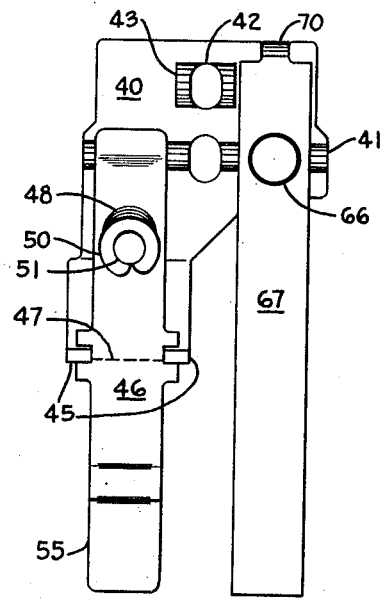
Figure 5 is a top view of the lever assembly portion of the control.

Upstanding ears 38 and 39 on lever 32 serve to transmit force to an intermediate lever 40 (Figures 2, 3, 4, and 5) which has a transverse indentation 41 extending across its full width and receiving the pointed ends of ears 38 and 39. As may best be seen at Figure 5, the lever 40 is generally triangularly-shaped, and at its wider end has an opening 42 and in intended bearing portion 43. As shown in Figures 3 and 5, the narrow end of lever 40 has two upturned fingers 45 which fit into side notches in an auxiliary lever 46, lever 46 being thereby retained in overlying relation to lever 40. A central portion 47 at the end of lever 40 (Figures 3 and 4) is tipped out of the general plane of lever 40 to provide a bearing edge for one end of lever 46. The other end of lever 46 is supported on the rounded, outer face of the groove 41 in the lever 40 as may best be seen in Figures 3 and 5. Levers 40 and 46 are held in engagement by means of a compression spring 48 (Figure 3) which is bottomed at one end on the lever 46 and at its other end on a retainer ring 50 which is secured to a central pin 51. Pin 51 extends freely through openings 52 (Figure 4) in both levers 40 and 46, and its head 53 is held tightly against the underside of the lever 40. From the foregoing it will be apparent that levers 40 and 46 normally move as one, but by compression of spring 48, lever 46 may be pivoted about tongue 47 and thereby pivotally moved with relation to lever 40.

The free end of lever 46 has an offset portion 55 (Figure 3) which is normally in contact with the thrust pin 56 of an enclosed, normally-open switch 57. Switch 57 has terminal screws 58 and is mounted within the control device housing by means of through pins 60 which extend through sidewalls 10 and 11 and switch 57.

Front face member 12 carries an internally threaded stud 61 through which is threaded an adjusting screw 62. Screw 62 extends freely through appropriate openings in member 12 and plate 15, and at its outer end has a slotted head 63 and a pointer 64 which cooperates with the indicia 16 on the plate 15 and with a stop 59 struck from the plate 15. The inner end of screw 62 has a reduced end portion 65 which extends freely through the opening 42 in the lever 40 and forms a shoulder adapted to bear on the rounded face of the bearing portion 43 of lever 40.

Figure 2:
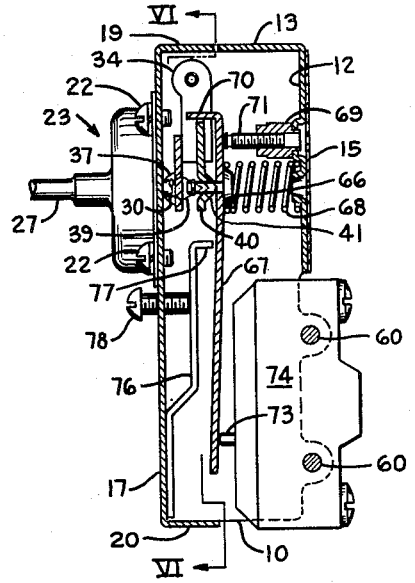
Figure 2 is a sectional view taken generally along the lines II—II of Figure 1.
Figure 3:
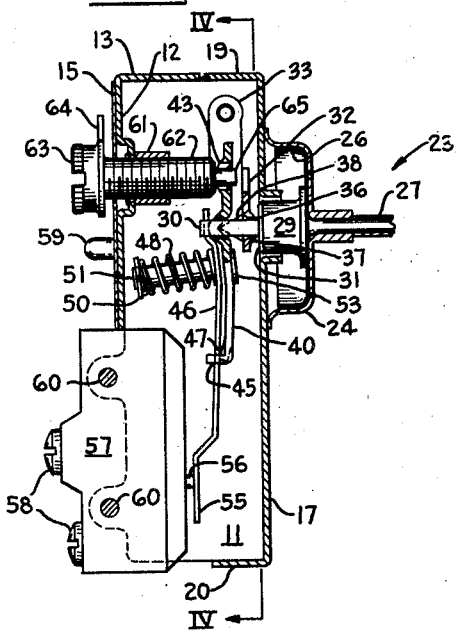
Figure 3 is a sectional view taken generally along the lines III—III of Figure 1.
Figure 4:
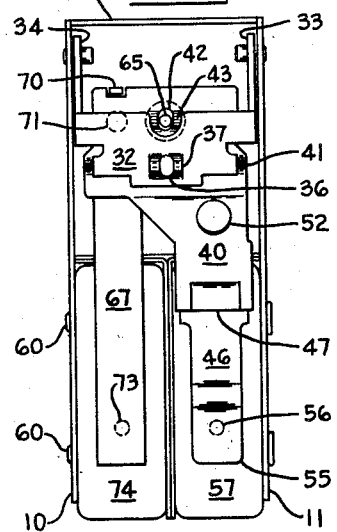
Figure 4 is a sectional view taken generally along the lines IV—IV of Figure 3.

Referring principally to Figure 2 (in which, for clarity, a portion of thrust pin 30 is cut away), the other of the dual switching mechanisms will be described. Held loosely in overlying relation to lever 40 is an operating lever 67. Lever 67 is fastened loosely to lever 40 by means of pin 66 which passes freely through both levers 40 and 67, and a tongue 70 formed at the end of lever 67, which extends loosely through an appropriate notch at the end of lever 40 (Figure 5). A return spring 68, a compression spring, extends between lever 67 and front plate 12. Plate 12 also carries an internally threaded stud 69, into which is threaded a screw 71 whose rounded inner end bears normally against lever 67. An opening in face plate 15 permits screw 71 to be accessible for adjustment from the exterior of the control device.

The free end of lever 67 overlies, and is in contact with, the thrust pin 73 of a normally closed, enclosed-type switch 74, similar to switch 57. Switch 74 is mounted and held adjacent to switch 57 by means of through-pins 60.

Figure 6:
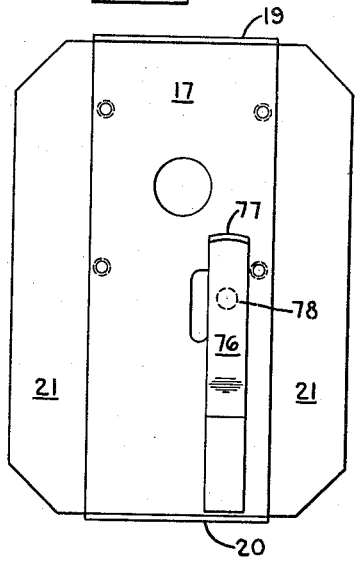
Figure 6 is a sectional view taken generally along the lines VI—VI of Figure 2 and showing the sub-base and fail-safe lever.

A fail-safe lever 76 (Figures 2 and 6) is fastened, by any suitable means, to the inner face of the base plate 17. Lever 76 has its end portion 77 bent perpendicularly to the general plane of the lever, this upturned edge being adapted to contact the lever 67 under certain circumstances as will subsequently be explained. A screw 78 is threaded through an opening in plate 17 and bears against the lever 76. Screw 78 is accessible from the rear of the control device and can be adjusted to vary the position of the free end of lever 76 with respect to base plate 17.

*Operation*

As may be seen in Figures 2 and 3, switch 57 is shown with its thrust pin 56 depressed and its contacts are therefore closed. Switch 74 is shown with its thrust pin 73 extended and its contacts are also, therefore, closed. For illustration it can be assumed that switch 57 is connected into a heating system so as to control the operation of the heating medium circulator, a fan, for example, that the temperature sensing bulb portion of element 23 is located in the heated air stream, and that the fan switch 57 is set to open when element 23 has taken a position corresponding to 100° F. at the temperature sensing bulb and to reclose when the temperature has risen to, for example 130° F. Under such an assumption it will be apparent that, as shown in Figure 3, since fan switch 57 is closed, the temperature at the temperature sensing bulb must be considered to be within 100°–130°. After the rooms to which the heated air is delivered by the fan are warmed, the heat generating portion of the heating plant will be shut off and the temperature of the circulated air, now no longer heated, will begin to decrease. As a result the liquid in the temperature sensing element will contract causing the stud 29 to move to the right, as viewed in Figure 3. The restoring force exerted by the switch 57 on its thrust pin 56 will thereupon pivotally move levers 46 and 40, as a unitary member, counterclockwise (as viewed in Figure 3) about the shoulder on adjusting screw 62. Lever 32 will, of course, also be pivotally moved counterclockwise about its pivotal connection to the side plates 10 and 11 as the stud 29 retreats to the right (as viewed in Figure 3). When the temperature of the circulated air has fallen to, for example, 100° F., the counterclockwise movement of the levers just described will have proceeded sufficiently to permit switch 57 to be restored to its normally open position and the fan will consequently be shut off and air circulation will cease.

Upon subsequent operation of the heating plant, as the air in the furnace is heated, the resulting movement of stud 29 to the left, as viewed in Figure 3, will result in clockwise pivotal movement of lever 32 and levers 46 and 40, these latter levers pivoting, as a unit, on the end of adjusting screw 62. This movement will depress the thrust pin 56 of the fan switch 57 and when stud 29 has moved to a position corresponding to, for example, 130° F., the switch 57 will move to its closed position starting the fan. The fan will thus be operated until the temperature of the air being circulated again falls to 100° and switch 57 reopens, as previously described.

Adjustment of the temperature value at which switch 57 will open can be made by turning adjusting screw 62. As will be apparent from Figure 3, this adjustment varies the pivotal position of the lever system composed of levers 46 and 40 with relation to the position of stud 29. It will be understood that the temperature at which switch 57 will be actuated to its closed position will be a fixed increment, for example 30°, above the temperature at which switch 57 opens, this temperature increment or differential being an internal characteristic of the switch 57.

Referring now principally to Figure 2 the operation of the limit switch (switch 74) portion of the control device will be described. As previously mentioned, the limit switch 74 is connected so as to control operation of the heat generating portion of the heating plant, for example, an oil or gas burner, and operates to shut off the burner if the temperature of the heating medium should rise to an unsafe value.

If it is assumed that safety and the design of the particular heating plant or furnace require that the temperature of the air (assuming a warm air furnace is under consideration) not exceed 200° F., it will be apparent that, as shown in Figure 2, such limiting temperature has not been reached and normally closed switch 74 remains closed. As the temperature to which element 23 responds increases, pin 30 and stud 29 (not shown in Figure 2) will move so as to pivotally move lever 32 and consequently lever 40 counterclockwise as viewed in Figure 2. This will result in counterclockwise pivotal movement of lever 67 about the end of adjusting screw 71, and the free end of lever 67 will depress the thrust pin of limit switch 74. When element 23 has expanded to a position corresponding to a temperature of 200° at its temperature sensing bulb, lever 67 will actuate switch 74 to its open position, thereupon shutting down the heating plant. As the temperature within the heating plant drops, the reverse movement of the levers will take place and switch 74 will reset to its normal closed position.

As lever 67 is moved to operate switch 74 at the assumed limiting temperature of 200°, lever 40 and consequently lever 46 (Figure 3) will be moved far beyond the normal range of movement through which they travel in operating fan switch 57. As may be seen in Figure 3, movement of lever 40 beyond the point at which lever 46 can depress pin 56 no further will cause lever 46 to pivot counterclockwise at tongue 47, the top end (as viewed in Figure 3) of lever 46 moving away from lever 40 and spring 48 being consequently compressed. Spring 48 thereby serves as a strain relief, absorbing the energy produced by the prolonged expansion of element 23 and preventing internal deformation of switch 57 or of the lever 46.

Proper operation of the control device, of course, depends upon the integrity of the liquid filled system comprising the temperature sensing bulb, the actuating element 23 and the interconnecting tubing 27. Should an opening or leak occur in this system, the resulting partial or complete loss of the liquid fill would render the control device inoperative and would leave the heating system without the protection of a high temperature limit control. Because of this danger a highly desirable feature of control devices of the type embodied by the present invention is the fail-safe function, i. e., upon a loss of liquid fill in the temperature sensing system, the limit switch, controlling operation of the heating plant is actuated to open position.

As may best be seen in Figure 2, the control device embodying the present invention accomplishes this fail-safe function by reversal of the action of the levers linking the actuator element 23 and the limit switch 74. Upon a loss of liquid fill in the temperature sensing system, contraction of actuator 23 will cause stud 29 and pin 30 to recede. Because of the force exerted by spring 68, levers 40 and 67 are pivotally moved clockwise (as viewed in Figure 2) about their normal pivots, screws 62 and 71, respectively. This movement of lever 67 permits limit switch 74 to remain in its normally closed position; however, as such movement continues, lever 67 eventually contacts the end portion 77 of the fail-safe lever 76 and further movement of lever 67 to the left (as viewed in Figure 2) causes lever 67 to pivot counterclockwise about the portion 77. This reversal in direction of pivotal movement of lever 67 results in its free end depressing the thrust pin 73 of switch 74 to actuate switch 74 to open position, thereby shutting down the heating plant. The point along the retractive path of pin 30 and stud 29 at which this reversal in movement of lever 67 takes place can, obviously, be adjusted by means of screw 78.

It should be particularly noted that the arrangement of the switches 57 and 74 side by side in the switch housing, though providing a compact assembly, does apply a loading to the lever system at points substantially displaced sidewardly from the central axis of the system and thereby a considerable tilting or twisting stress is exerted on the lever assembly. The difficulties thus introduced are remedied, in the present invention, by use of the force transmitting lever 32 which applies actuating force to the lever assembly at the laterally, widely-spaced points 38 and 39 and which, in its pivotal movement in transmitting force to the lever assembly, is itself pivotally supported at legs 33 and 34 which are positioned outside the configuration of the lever assembly. This arrangement provides the lateral rigidity to the structure which is necessary to absorb the stresses of unequal loading, laterally, of the lever assembly.

Additionally, it should be noted that adjustment of screws 62 and 71 serve to independently vary the angular positions of levers 40 and 67, respectively, in relation to the direction of application of the actuating force from element 23. Since lever 67, though carried by lever 40, is pivoted thereto at the location on lever 40 where the force from element 23 is applied, a change in angular position of lever 40 about this point does not affect or alter the position of lever 67, and adjustment of the operating point of the switch 57 by means of screw 62 does not affect the setting of switch 74 established by screw 71, and vice versa, the adjustments may be made independently. Mounting of the limit switch operating lever 67 on the lever 40 which operates the fan switch 57 has the further advantage that each operation of the fan switch (which presumably occurs much oftener than operation of the safe temperature limit switch) checks the proper functioning of the lever assembly and assures that though the limit switch is operated only rarely and under emergency conditions, the lever system on which its operation depends is functioning properly.

Modifications of the present invention may occur to those skilled in the art, and this invention, therefore, is intended to be limited only by the scope of the appended claims and the prior art.

What is claimed is:

1. A control device of the type in which multiple control means are actuated by a single condition responsive member comprising: a condition responsive element, first and second control means, and linkage means interconnecting said element and said control means to operate said first control means at a normal value of the condition and said second control means at a limiting high value of the condition, said linkage including a first pivotally moveable lever for operating said first control means, a second lever coextensive with said first lever mounted on said first lever for pivotal movement and adapted to operate said second control means, and a force transmitting lever pivotally mounted outboard of said first and second levers for transmitting the force exerted by the condition responsive element to said first and second levers.

2. A control device as claimed in claim 1 wherein said first and second control means are adjacently mounted, normally open and normally closed electrical switches respectively.

3. A control device of the type in which multiple control means are actuated by a single condition responsive member comprising: an expansible element responsive to changes in temperature, a normally open switch and a normally closed switch, linkage means interconnecting said element and said switches to operate the normally open switch at a first temperature and the normally closed switch at a second temperature higher than said first temperature, said linkage including a first pivotally moveable lever for operating said normally open switch, a second lever coextensive with said first lever mounted on said first lever for pivotal movement and adapted to operate said normally closed switch, a motion transmitting lever pivotally mounted outboard of said first and second levers for transmitting the force exerted by the expansible element to said first and second levers, and strain relief means interposed between said first lever and said normally open switch to permit movement of said first lever beyond the operating point of the normally open switch as said expansible element responds to said second temperature and said second lever operates said normally closed switch.

4. A control device as claimed in claim 3 wherein the said first and second temperatures are independently adjustable.

5. A control device of the type in which multiple control means are actuated by a single condition responsive member comprising: motion transmitting means moveable in one direction by said condition responsive member upon an increase in said condition and moveable in reverse direction upon a decrease in said condition, a first control means, a first lever adapted to be pivotally moved to actuate said first control means after said motion transmitting means has moved a fixed distance in said first direction, a second lever carried by said first lever and capable of limited pivotal movement relative thereto, a second control means adapted to be actuated by movement of said second lever after said motion transmitting means has moved a further distance in said one direction, and an abutment cooperating with said second lever, upon prolonged movement of said force transmitting member in said reverse direction, to reverse the movement of said second lever and again actuate said second control means.

6. A control device as claimed in claim 5 wherein the position of said abutment with relation to said second lever, and consequently the amount of movement of said force transmitting member in reverse direction necessary to actuate said second control means, is adjustable.

7. A control device as claimed in claim 5 wherein the condition responsive member is a temperature responsive expansible element, and the first and second control means are a normally open snap switch and a normally closed snap switch, respectively.

8. A control device having a housing, a temperature responsive element mounted on said housing and having a member extending within said housing and moveable in response to changes in temperature at a selected location, first and second control means mounted adjacently within said housing, an adjustable abutment accessible from outside said housing and extending into said housing, a first lever having one end adapted to operate the first control means and its other end bearing on said adjustable abutment, a second lever pivotally mounted on the first lever having one of its ends adapted to operate said second control means, and means for applying the force exerted by said moveable member, in response to changes in temperature, to said first lever at a point thereon intermediate its ends, said point of application being in longitudinal alignment with the pivotal mounting of said second lever on said first lever.

9. A control device as claimed in claim 8 wherein a strain relief means is interposed between the said one end of the first lever and said first control means.

10. A control device as claimed in claim 8 wherein a second adjustable abutment cooperates with the other end of said second lever.

11. A control device as claimed in claim 8 wherein the temperature responsive element is a fluid expansion chamber and the first and second control means are adjacently mounted, enclosed snap switches.

12. A control device as claimed in claim 8 wherein an additional abutment, is provided, said additional abutment being cooperable with said first lever only upon prolonged movement of said moveable member in temperature decrease direction.

13. A control device having a housing, a temperature responsive fluid expansion chamber mounted on said housing and having a member extending within said housing and moveable in response to changes in temperature at a selected location, first and second snap switch assemblies mounted adjacently within said housing, an adjustable abutment accessible from outside said housing and extending into said housing, a first lever having one end adapted to operate the first snap switch and its other end bearing on said adjustable abutment, a second lever pivotally mounted on the first lever and having one of its ends adapted to operate said second snap switch, a second adjustable abutment extending into said housing and cooperable with the other end of said second lever, and means for applying the force exerted by said moveable member, in response to changes in temperature, to said first lever at a point thereon intermediate its ends, said point of application being in longitudinal alignment with the pivotal mounting of said second lever on said first lever.

14. A control device as claimed in claim 13 wherein the second adjustable abutment is also accessible from outside said housing.

15. A control device as claimed in claim 13 wherein a strain relief means is interposed between the said one end of the first lever and said first snap switch.

16. A control device including an elongated housing, a temperature responsive fluid expansion chamber mounted on said housing adjacent one end thereof and having a member extending within said housing moveable in response to changes in temperature at a selected location, first and second enclosed snap switches mounted within said housing adjacent its other end, an adjustable abutment accessible from outside said housing and extending into said housing near said one end thereof, a first lever extending lengthwise through said housing and having one end adapted to operate the first snap switch and its other end bearing on said adjustable abutment, a second lever pivotally mounted on the first lever and coextensive therewith, said second lever having one of its ends adapted to operate said second snap switch, and means for applying the force exerted by said moveable member, in response to a temperature change, to said first lever at a point thereon intermediate its ends, said point of application being in longitudinal alignment with the pivotal mounting of said second lever on said first lever.

17. A control device as claimed in claim 16 wherein an additional abutment is provided on the side of the first lever opposite said first abutment, said additional abutment being cooperable with the first lever only upon prolonged movement of said member in temperature decrease direction.

References Cited in the file of this patent

UNITED STATES PATENTS

| | | |
|---|---|---|
| 2,272,864 | Baak | Feb. 10, 1942 |
| 2,520,370 | Offutt | Aug. 29, 1950 |
| 2,620,414 | Thorsheim | Dec. 2, 1952 |